(12) United States Patent
Honma et al.

(10) Patent No.: US 10,725,285 B2
(45) Date of Patent: Jul. 28, 2020

(54) DISPLAY DEVICE

(71) Applicant: NIPPON SEIKI CO., LTD., Niigata (JP)

(72) Inventors: Kazuki Honma, Niigata (JP); Makoto Hada, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 182 days.

(21) Appl. No.: 16/060,353

(22) PCT Filed: Dec. 9, 2016

(86) PCT No.: PCT/JP2016/086705
§ 371 (c)(1),
(2) Date: Jun. 7, 2018

(87) PCT Pub. No.: WO2017/104566
PCT Pub. Date: Jun. 22, 2017

(65) Prior Publication Data
US 2018/0364474 A1 Dec. 20, 2018

(30) Foreign Application Priority Data
Dec. 18, 2015 (JP) .................. 2015-247974

(51) Int. Cl.
*G02B 26/08* (2006.01)
*G02B 26/02* (2006.01)
(Continued)

(52) U.S. Cl.
CPC .......... *G02B 26/0833* (2013.01); *B60K 35/00* (2013.01); *G02B 26/02* (2013.01);
(Continued)

(58) Field of Classification Search
CPC ................................ G02B 26/0833; G02B 27/01; G02B 27/0101; G02B 26/02; B60K 35/00;
(Continued)

(56) References Cited

U.S. PATENT DOCUMENTS 5,768,007 A 6/1998 Knipe et al.
2001/0053016 A1 12/2001 Nelson
(Continued)

FOREIGN PATENT DOCUMENTS

JP H07-266923 A 10/1995
JP H09-189871 A 7/1997
(Continued)

OTHER PUBLICATIONS

Extended European Search Report issued in corresponding European Patent Application No. 16875546.0-1210, dated Apr. 16, 2019.
(Continued)

*Primary Examiner* — Euncha P Cherry
(74) *Attorney, Agent, or Firm* — McDermott Will & Emery LLP

(57) ABSTRACT

Provided is a display device capable of reliably moving a micromirror to a parking position when operation is stopped. A head-up display device drives a DMD element on the basis of electric power from a battery power supply. The head-up display device is provided with: a DMD controller for performing control of the DMD element on the basis of the electric power from the battery power supply; a voltage monitoring circuit for monitoring the voltage of the battery power supply; and a backup power supply for supplying power to the DMD controller as a backup of the battery power supply. When the voltage of the battery power supply which has been monitored by the voltage monitoring circuit falls to or below a threshold value, the DMD controller
(Continued)

moves the DMD element to the parking position on the basis of the electric power from the backup power supply.

7 Claims, 7 Drawing Sheets

(51) Int. Cl.
  *B60K 35/00* (2006.01)
  *H04N 5/66* (2006.01)
  *G02B 27/01* (2006.01)
  *G09G 3/00* (2006.01)
  *G09G 3/34* (2006.01)

(52) U.S. Cl.
  CPC ......... *G02B 27/01* (2013.01); *G02B 27/0101* (2013.01); *G09G 3/002* (2013.01); *G09G 3/3406* (2013.01); *H04N 5/66* (2013.01); *G09G 2310/061* (2013.01); *G09G 2330/026* (2013.01); *G09G 2330/027* (2013.01); *G09G 2330/04* (2013.01)

(58) Field of Classification Search
  CPC ........ H04N 5/66; G09G 3/002; G09G 3/3406; G09G 2330/04; G09G 2330/026; G09G 2330/027; G09G 2310/061
  USPC ...................................................... 359/224.1
  See application file for complete search history.

(56) References Cited

U.S. PATENT DOCUMENTS

| | | | |
|---|---|---|---|
| 2015/0214961 A1* | 7/2015 | Toriumi | ............ H03L 7/1976 331/158 |
| 2015/0323143 A1 | 11/2015 | Raring et al. | |

FOREIGN PATENT DOCUMENTS

| | | | |
|---|---|---|---|
| JP | 2001-242395 A | 9/2001 |
| JP | 2001-305683 A | 11/2001 |
| JP | 2004-093970 A | 3/2004 |
| JP | 2004-205588 A | 7/2004 |
| JP | 2006-190197 A | 7/2006 |
| JP | 2009-169286 A | 7/2009 |
| JP | 2009-229758 A | 10/2009 |
| JP | 2009-265216 A | 11/2009 |
| JP | 2012-003092 A | 1/2012 |
| JP | 2014-010417 A | 1/2014 |

OTHER PUBLICATIONS

Search Report issued in corresponding International Patent Application No. PCT/JP2016/086705, dated Mar. 7, 2017.

* cited by examiner

DISPLAY DEVICE

CROSS REFERENCE

This application is the U.S. National Phase under 35 U.S.C. § 371 of International Application No. PCT/JP2016/086705, filed on Dec. 9, 2016, which claims the benefit of Japanese Application No. 2015-247974, filed on Dec. 18, 2015, the entire contents of each are hereby incorporated by reference.

TECHNICAL FIELD

The present invention relates to a display device.

BACKGROUND ART

A display device configured to display an image using, for example, a digital micromirror device (DMD) element is known. Specifically, such a type of display device generates image light by reflecting illumination light toward a projection optical system with a plurality of micromirrors included in the DMD element. For example, a display device described in PTLs 1 and 2 operates in what is called a field sequential method, which generates illumination light of an intended color by selectively causing any one of three light sources which respectively emit red light, green light, and blue light to perform light emission and switching, at high speed, a light source that is caused to perform light emission.

In particular, as described in PTL 2, the micromirrors are driven in the range of ±12 degrees around a hinge. For example, when the micromirrors are on, the micromirrors are situated at +12 degrees. At this time, the micromirrors reflect illumination light toward a projection optical system. On the other hand, when the micromirrors are off, the micromirrors are situated at −12 degrees. At this time, the micromirrors reflect illumination light in a direction different from that of the projection optical system. Moreover, when the display device is powered off, the micromirrors are returned to 0° (a parking position), which is a middle point.

CITATION LIST

Patent Literature

PTL 1: JP-A-2012-3092
PTL 2: JP-A-2014-010417

SUMMARY OF INVENTION

Technical Problem

In the display device described in PTL 2, it may be assumed that supplying of electric power to a DMD element is abruptly cut off due to an in-vehicle battery being removed or due to the occurrence of cranking, in which voltage temporarily decreases according to a large amount of current flowing when the starter of an engine is activated. In this instance, the display device cannot return the micromirrors to the parking position, and the inclination of the micromirrors is firmly fixed at a position other than the parking position, so that, for example, a bright spot defect or a black spot defect may occur in the display device.

The invention has been made in the above-mentioned actual condition, and has an object to provide a display device that is capable of, when stopping operation, reliably moving micromirrors to a parking position.

Solution to Problem

To attain the above-mentioned object, a display device of the invention, which is a display device that displays an image by driving a DMD element based on electric power supplied from a battery power supply, includes a DMD controller that performs control of the DMD element based on electric power supplied from the battery power supply, a voltage monitoring unit that monitors a voltage of the battery power supply, and a backup power supply that is capable of supplying electric power to the DMD controller as a backup of the battery power supply, wherein, when the voltage of the battery power supply monitored by the voltage monitoring unit has become equal to or lower than a threshold value, the DMD controller moves the DMD element to a parking position based on electric power supplied from the backup power supply.

Advantageous Effects of the Invention

According to the invention, at the time of stopping of operation, micromirrors can be reliably moved to a parking position.

DESCRIPTION OF EMBODIMENTS

First Embodiment

Hereinafter, a first embodiment in which a display device according to the invention is applied to a head-up display device which is mounted in a vehicle is described.

Figure 1:
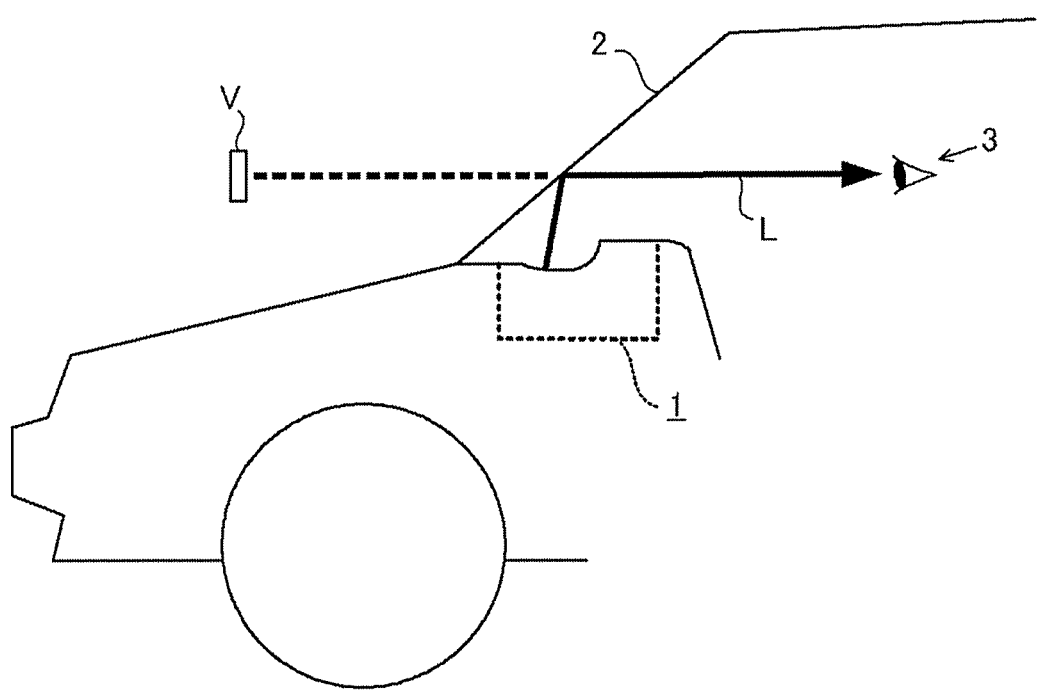
FIG. 1 is a schematic diagram of a vehicle in which a head-up display device is mounted according to a first embodiment of the invention.

As illustrated in FIG. 1, a head-up display device 1, which is provided in the dashboard of a vehicle, emits display light L representing a display image toward a windshield 2. A viewer 3 (mainly, a driver) can view a virtual image V of the display image by receiving the display light L reflected from the windshield 2.

(Configuration of Head-Up Display Device)

Figure 2:
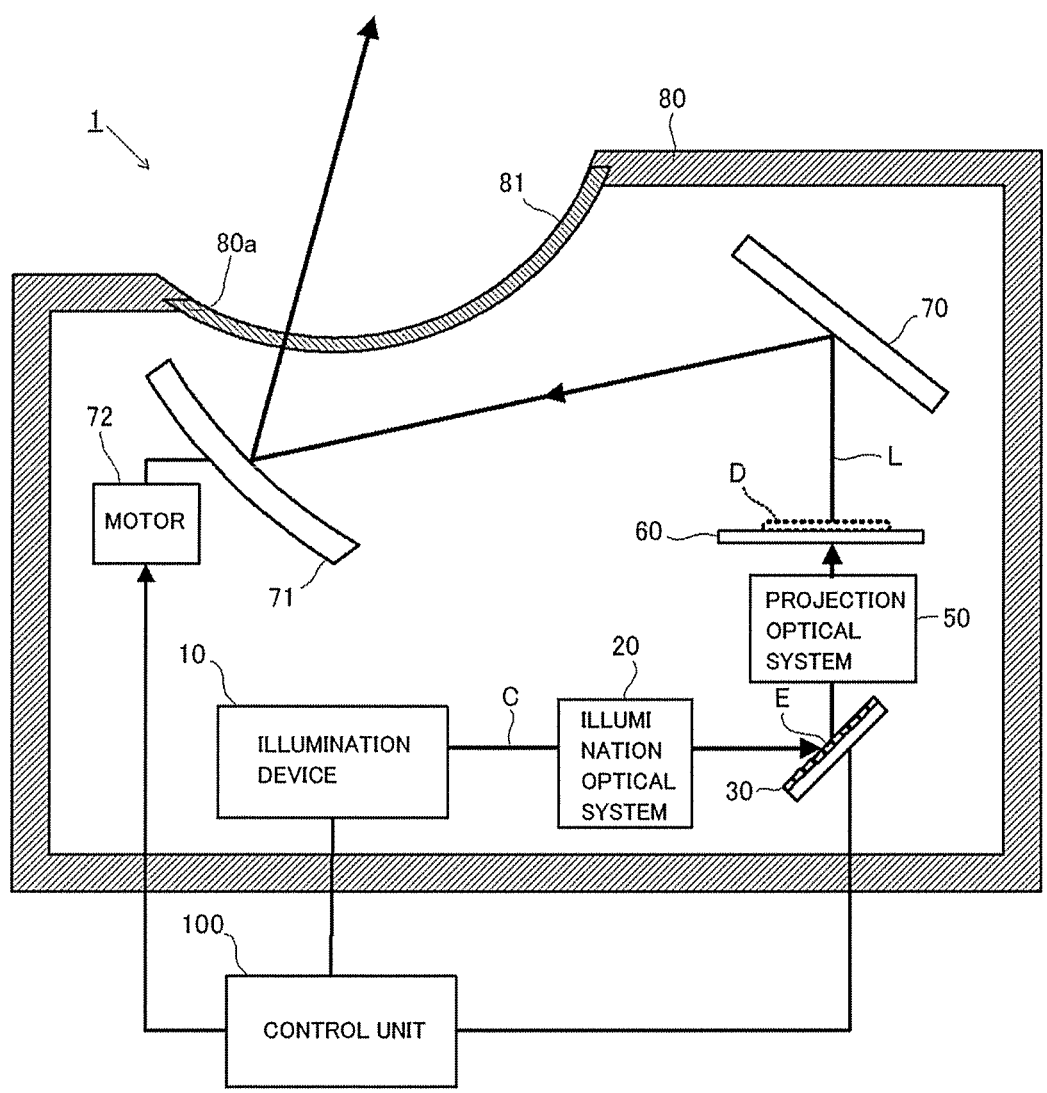
FIG. 2 is an outline diagram illustrating a configuration of the head-up display device according to the first embodiment of the invention.

As illustrated in FIG. 2, the head-up display device 1 includes an illumination device 10, an illumination optical system 20, a DMD element 30, a projection optical system 50, a screen 60, a planar mirror 70, a concave mirror 71, which is an example of a reflection unit, a housing 80, a motor 72, which is an example of a driving unit, and a control unit 100.

The housing 80 is formed in a box shape with, for example, hard resin. The housing 80 has an opening portion 80a formed at a surface facing the windshield 2, and the opening portion 80a is closed by a window portion 81 formed in a curved shape with transparent resin such as acrylic. The display light L travels from inside the housing 80 toward the windshield 2 while passing through the window portion 81. The constituent units of the head-up display device 1 other than the control unit 100 are incorporated in the housing 80. Furthermore, the control unit 100 can be configured to be provided within the housing 80.

Figure 3:
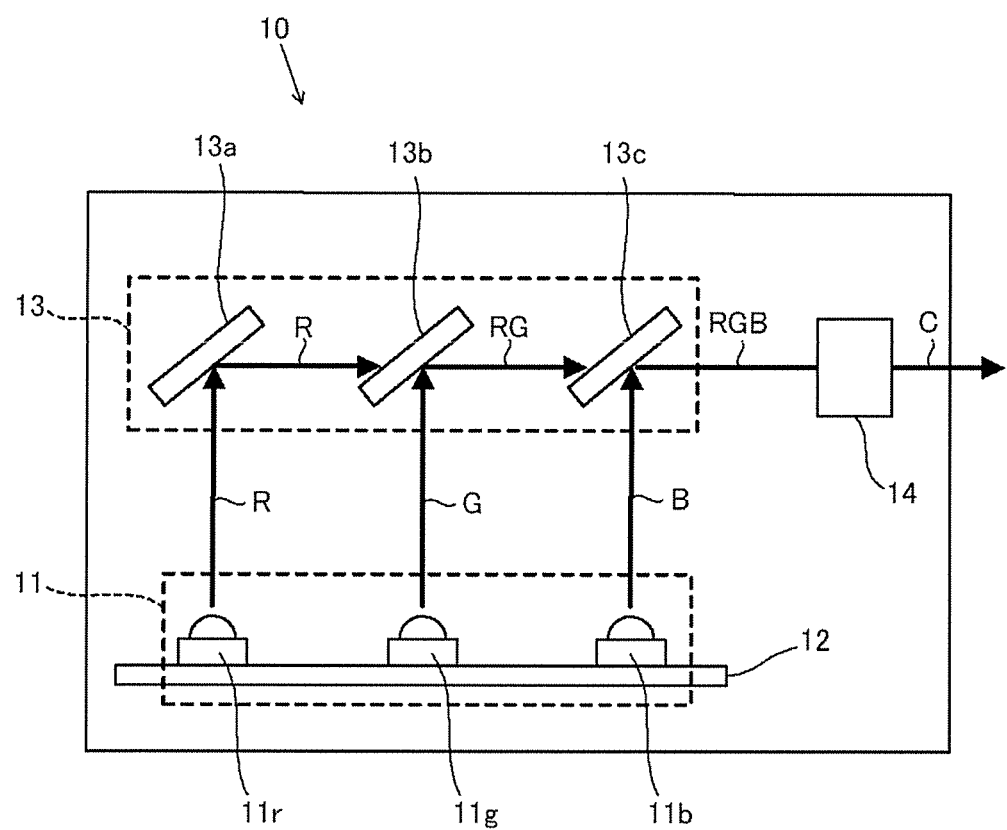
FIG. 3 is an outline diagram illustrating a configuration of an illumination device according to the first embodiment of the invention.

As illustrated in FIG. 3, the illumination device 10 includes an illumination unit 11, a reflection and transmission optical unit 13, and a luminance unevenness reducing optical unit 14.

The illumination unit 11 includes a red light emitting diode (LED) 11r, which emits red light R, a green LED 11g, which emits green light G, and a blue LED 11b, which emits blue light B. In a display period, the control unit 100 performs control of the illumination unit 11 in a field sequential method, which causes any one of the three LEDs 11r, 11g, and 11b to perform light emission and switches between the LEDs 11r, 11g, and 11b caused to perform light emission at intervals of a predetermined time.

As illustrated in FIG. 3, the reflection and transmission optical unit 13, which is configured to generate illumination light C based on light R, light G, and light B, includes a reflection mirror 13a, which reflects light, and dichroic mirrors 13b and 13c, each of which is configured with a mirror having a mirror surface on which a thin film such as a dielectric multi-layer film is formed and each of which performs transmission and reflection of light.

The reflection mirror 13a is provided at a position to reflect red light R emitted from the red LED 11r toward the luminance unevenness reducing optical unit 14. The dichroic mirror 13b is provided at a position to reflect green light G emitted from the green LED 11g toward the luminance unevenness reducing optical unit 14 and to allow red light R coming from the reflection mirror 13a to pass through the dichroic mirror 13b. The dichroic mirror 13c is provided at a position to reflect blue light B emitted from the blue LED 11b toward the luminance unevenness reducing optical unit 14 and to allow red light R coming from the reflection mirror 13a and green light G coming from the dichroic mirror 13b to pass through the dichroic mirror 13c toward the luminance unevenness reducing optical unit 14.

The luminance unevenness reducing optical unit 14, which is a unit configured with, for example, a mirror box or an array lens, reduces unevenness of light by diffuse-reflecting, scattering, and refracting the illumination light C. In this way, the illumination device 10 emits the illumination light C toward the illumination optical system 20.

The illumination optical system 20, which is configured with, for example, a concave lens, adjusts the illumination light C emitted from the illumination device 10 to a size corresponding to the DMD element 30.

As illustrated in FIG. 2, the DMD element 30 includes movable micromirrors E arranged in a matrix shape. The micromirrors E are able to be slanted in the range of ±12 degrees around a hinge (not illustrated) by being switched between on and off under the control of the control unit 100 (to be precise, a DMD controller 112 described below).

When the micromirrors E are on, the micromirrors E are slanted +12 degrees around the hinge and reflects the illumination light C emitted from the illumination optical system 20 toward the projection optical system 50. When the micromirrors E are off, the micromirrors E are slanted −12 degrees around the hinge and reflects the illumination light C in a direction different from that of the projection optical system 50. Accordingly, the DMD element 30 projects only a display image D in the illumination light C toward the projection optical system 50 by individually driving each micromirror E. Moreover, when the head-up display device 1 is switched to power off, each micromirror E is returned to 0 degrees (a parking position), which is a middle point, around the hinge. The parking position is a position to enable preventing the inclination of each micromirror E from being firmly fixed.

As illustrated in FIG. 2, the projection optical system 50, which is configured with, for example, a concave lens or a convex lens, efficiently irradiates the screen 60 with display light L corresponding to a display image D projected from the DMD element 30.

The screen 60, which is configured with, for example, a diffusion plate, a holographic diffuser, and a microlens array, receives display light L emitted from the projection optical system 50 at the lower surface thereof and displays a display image D at the upper surface thereof.

The planar mirror 70 reflects display light L corresponding to the display image D coming from the screen 60 toward the concave mirror 71. The concave mirror 71 reflects display light L coming from the planar mirror 70 toward the window portion 81.

The motor 72, which is an example of a driving unit, is configured with, for example, a stepping motor, and is driven under the control of the control unit 100 to change the angle of the concave mirror 71. Adjusting the reflection direction of display light L by the angle of the concave mirror 71 being changed enables adjusting the display position of the virtual image V.

Next, an electrical configuration of the head-up display device 1 is described.

Figure 4:
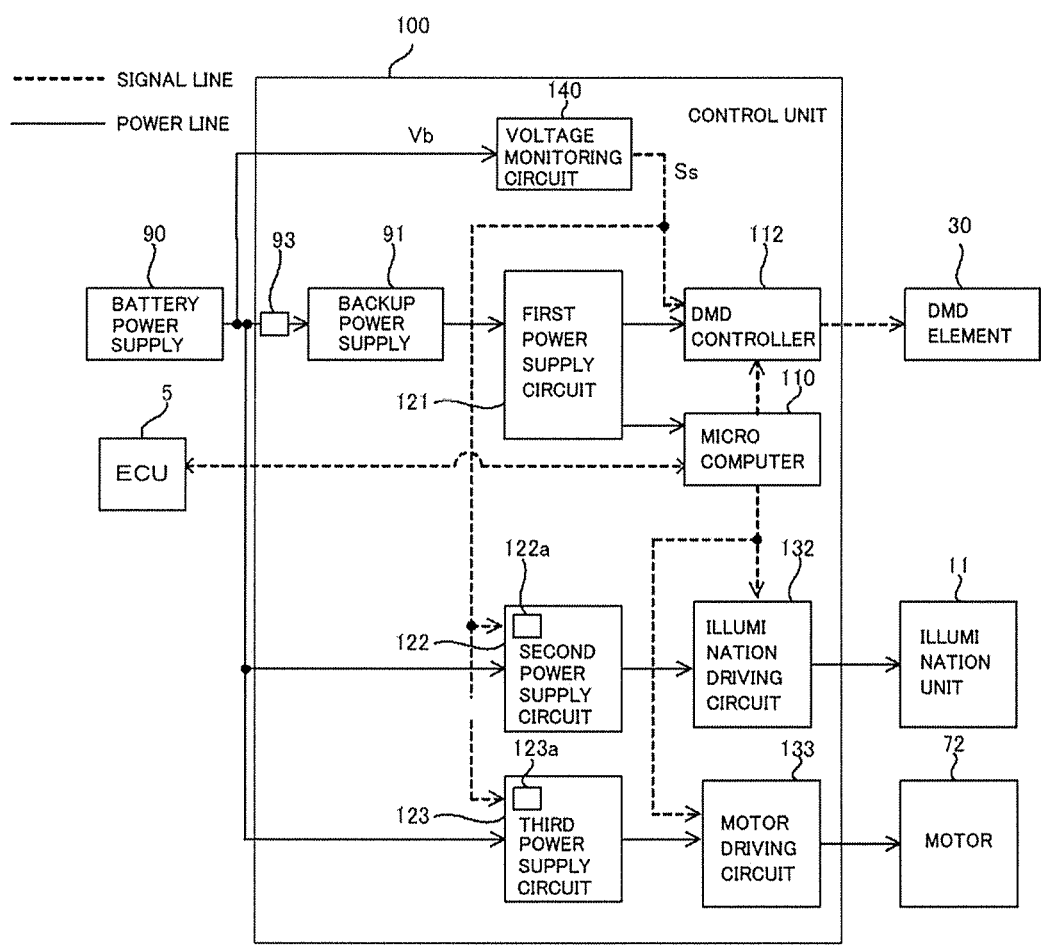
FIG. 4 is a block diagram illustrating an electrical configuration of the head-up display device according to the first embodiment of the invention.

As illustrated in FIG. 4, the head-up display device 1 includes the control unit 100, the DMD element 30, the illumination unit 11, and the motor 72. The control unit 100 includes a voltage monitoring circuit 140, which is an example of a voltage monitoring unit, first to third power supply circuits 121 to 123, a microcomputer 110, a DMD controller 112, an illumination driving circuit 132, a motor driving circuit 133, a backup power supply 91, and a diode 93. Moreover, a battery power supply 90 and an electronic control unit (ECU) 5 are mounted in the vehicle.

The battery power supply 90, which is a battery that is mounted in the vehicle, is configured to be able to supply electric power to the first to third power supply circuits 121 to 123, the voltage monitoring circuit 140, and the backup power supply 91.

The backup power supply 91, which is configured with, for example, a capacitor, receives electric power from the battery power supply 90 and accumulates electricity. The backup power supply 91 has an electric capacity capable of accumulating electric power required to move each micromirror E to the parking position via the DMD controller 112 and the DMD element 30.

The diode 93 is connected between the backup power supply 91 and the battery power supply 90. The diode 93 prevents electric current from flowing from the backup power supply 91 to the battery power supply 90 when, for example, a short circuit has occurred in the battery power supply 90.

The voltage monitoring circuit 140 is configured with a single-function integrated circuit (IC), such as a complementary metal-oxide semiconductor (CMOS) reset IC. The voltage monitoring circuit 140 monitors the voltage Vb of the battery power supply 90, and, when the voltage Vb has become equal to or lower than a threshold value Vth (for example, 5 V), outputs a forced stop signal Ss to the DMD controller 112, the second power supply circuit 122, and the third power supply circuit 123. More specifically, the voltage monitoring circuit 140 outputs a Hi signal when the voltage Vb of the battery power supply 90 exceeds the threshold value Vth, and outputs a Lo signal when the voltage Vb of the battery power supply 90 is equal to or lower than the threshold value Vth. The Lo signal is equivalent to the forced stop signal Ss. For example, the threshold value Vth is set to a minimum voltage required to allow the DMD controller 112 and the microcomputer 110 to operate in a normal manner.

The first power supply circuit 121 generates electric power appropriate for operations of the DMD controller 112 and the microcomputer 110 based on electric power supplied from the battery power supply 90, and supplies the generated electric power to the DMD controller 112 and the microcomputer 110. When supplying of electric power from the battery power supply 90 is stopped, the first power supply circuit 121 is configured to be able to supply electric power from the backup power supply 91 to the DMD controller 112 and the microcomputer 110.

The second power supply circuit 122 generates electric power appropriate for an operation of the illumination driving circuit 132 based on electric power supplied from the battery power supply 90, and supplies the generated electric power to the illumination driving circuit 132. When receiving the forced stop signal Ss, the second power supply circuit 122 stops supplying of electric power to the illumination driving circuit 132. For example, the second power supply circuit 122 includes a switch element 122a which cuts off the flow path of electricity to the illumination driving circuit 132 by entering into an off state upon receiving the forced stop signal Ss.

The third power supply circuit 123 generates electric power appropriate for an operation of the motor driving circuit 133 based on electric power supplied from the battery power supply 90, and supplies the generated electric power to the motor driving circuit 133. When receiving the forced stop signal Ss, the third power supply circuit 123 stops supplying of electric power to the motor driving circuit 133. For example, the third power supply circuit 123 includes a switch element 123a which cuts off the flow path of electricity to the motor driving circuit 133 by entering into an off state upon receiving the forced stop signal Ss.

The DMD controller 112 controls the DMD element 30, specifically, each micromirror E, based on a control signal output from the microcomputer 110. Moreover, upon receiving the forced stop signal Ss from the voltage monitoring circuit 140, the DMD controller 112 returns each micromirror E to the parking position based on electric power supplied from the backup power supply 91.

The illumination driving circuit 132 performs control of the illumination unit 11 in the field sequential method as described above using electric power supplied from the second power supply circuit 122 based on a control signal output from the microcomputer 110.

The motor driving circuit 133 generates alternating-current power from electric power supplied from the third power supply circuit 123 based on a control signal output from the microcomputer 110, and supplies the generated alternating-current power to the motor 72. This causes the motor 72 to be driven as described above, thus enabling adjusting the angle of the concave mirror 71.

The microcomputer 110 is connected to the ECU 5 via a communication line. The microcomputer 110 performs communication of, for example, low-voltage differential signaling (LVDS) with the ECU 5, and controls the DMD controller 112, the illumination driving circuit 132, and the motor driving circuit 133 based on a result of the communication.

For example, the microcomputer 110 brings the head-up display device 1 into an on state when the ignition of the vehicle is in an on state, and brings the head-up display device 1 into an off state when the ignition of the vehicle is in an off state, based on information output from the ECU 5. When switching the head-up display device 1 from an on state to an off state, the microcomputer 110 returns each micromirror E to the parking position via the DMD controller 112, turns off the illumination unit 11 via the illumination driving circuit 132, and returns the concave mirror 71 to the initial position by driving the motor 72 via the motor driving circuit 133.

(Control Content of Control Unit)

Figure 5:
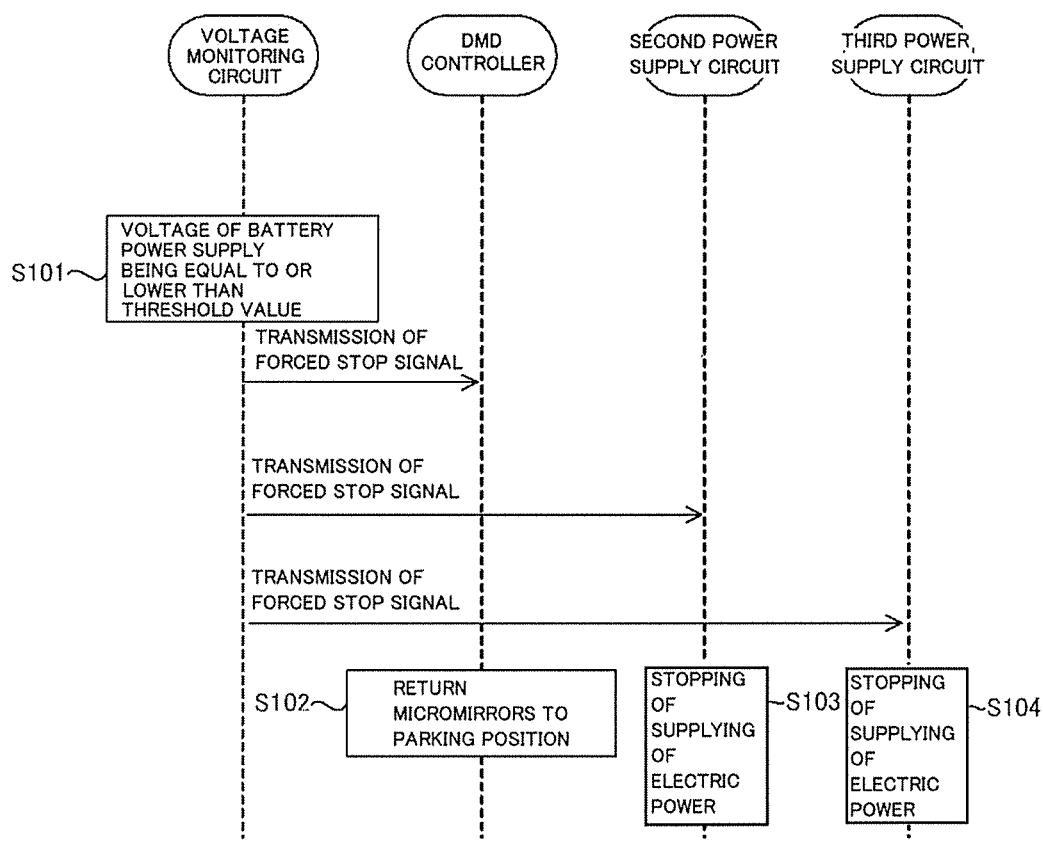
FIG. 5 is a sequence diagram illustrating control performed by a control unit according to the first embodiment of the invention.

Next, control procedures for the voltage monitoring circuit 140, the DMD controller 112, the second power supply circuit 122, and the third power supply circuit 123 in a case where the voltage of the battery power supply 90 has decreased rapidly due to, for example, cranking described in the above-mentioned background art are described with reference to FIG. 5.

When the voltage Vb of the battery power supply 90 has become equal to or lower than the threshold value Vth (S101), the voltage monitoring circuit 140 outputs the forced stop signal Ss to the DMD controller 112, the second power supply circuit 122, and the third power supply circuit 123. When receiving the forced stop signal Ss, the DMD controller 112 returns each micromirror E to the parking position based on electric power supplied from the backup power supply 91 via the first power supply circuit 121 (S102). At this time, without involvement from the microcomputer 110 at all, each micromirror E can be returned to the parking position. After returning the micromirrors E to the parking positions, the DMD controller 112 ends operation.

Moreover, when receiving the forced stop signal Ss, the second power supply circuit 122 stops supplying of electric power to the illumination driving circuit 132 (S103). Moreover, when receiving the forced stop signal Ss, the third power supply circuit 123 stops supplying of electric power to the motor driving circuit 133 (S104). This is the end of control performed by the voltage monitoring circuit 140, the DMD controller 112, the second power supply circuit 122, and the third power supply circuit 123 in a case where the voltage of the battery power supply 90 has decreased rapidly.

Advantageous Effects

Thus, according to the first embodiment described above, the following advantageous effects can be brought about.

(1) The head-up display device 1, which displays an image by driving the DMD element 30 based on electric power supplied from the battery power supply 90, includes the DMD controller 112, which performs control of the DMD element 30 based on electric power supplied from the battery power supply 90, the voltage monitoring circuit 140, which monitors the voltage Vb of the battery power supply 90, and the backup power supply 91, which supplies electric power to the DMD controller 112 as a backup of the battery power supply 90. When the voltage Vb of the battery power supply 90 monitored by the voltage monitoring circuit 140 has become equal to or lower than the threshold value Vth, the DMD controller 112 moves the DMD element 30 (the micromirrors E) to the parking position based on electric power supplied from the backup power supply 91.

According to this configuration, even in a case where the battery power supply 90 has been removed or a case where the voltage Vb of the battery power supply 90 has decreased due to the occurrence of cranking, the micromirrors E can be reliably moved to the parking position at the time of stopping of operation of the head-up display device 1. Therefore, in a case where the voltage Vb of the battery power supply 90 has decreased rapidly, the display quality of the head-up display device 1 can be prevented from decreasing due to the micromirrors E being firmly fixed.

(2) The head-up display device 1 includes the microcomputer 110, which controls the DMD controller 112, and the first power supply circuit 121, which supplies electric power to the microcomputer 110 and the DMD controller 112 based on electric power supplied from the battery power supply 90 or the backup power supply 91, the voltage monitoring circuit 140 outputs the forced stop signal Ss to the DMD controller 112 when the voltage Vb of the battery power supply 90 has become equal to or lower than the threshold value Vth, the first power supply circuit 121 generates backup electric power based on electric power supplied from the backup power supply 91, and, when receiving the forced stop signal Ss, the DMD controller 112 moves the DMD element 30 to the parking position based on the backup electric power without via the microcomputer 110.

According to this configuration, the DMD element 30 can be moved to the parking position without involvement from the microcomputer 110 at all. Therefore, the time required to move the DMD element 30 to the parking position can be prevented from being delayed by the processing time required by the microcomputer 110. This requires less electric capacity of the backup power supply 91. Moreover, this also enables attaining miniaturization of the backup power supply 91 and making the backup power supply 91 inexpensive.

(3) The head-up display device 1 includes the illumination unit 11, which irradiates the DMD element 30 with illumination light C, and the second power supply circuit 122, which supplies electric power to the illumination unit 11 based on electric power supplied from the battery power supply 90, and the voltage monitoring circuit 140 outputs the forced stop signal Ss to the second power supply circuit 122 to stop supplying of electric power to the illumination unit 11.

According to this configuration, when the voltage Vb of the battery power supply 90 has become equal to or lower than the threshold value Vth, electric power supplied from the backup power supply 91 can be prevented from being supplied to the illumination unit 11. Therefore, electric power of the backup power supply 91 is effectively used to move the DMD element 30 to the parking position. Accordingly, the DMD element 30 can be reliably moved to the parking position. Moreover, since electric power is not consumed by the illumination unit 11, less electric capacity of the backup power supply 91 is required. This also enables attaining miniaturization of the backup power supply 91 and making the backup power supply 91 inexpensive.

(4) The head-up display device 1 includes the concave mirror 71, which reflects display light L emitted from the DMD element 30, the motor 72, which drives the concave mirror 71, and the third power supply circuit 123, which supplies electric power to the motor 72 based on electric power supplied from the battery power supply 90, and the voltage monitoring circuit 140 outputs the forced stop signal Ss to the third power supply circuit 123 to stop supplying of electric power to the motor 72. According to this configuration, when the voltage Vb of the battery power supply 90 has become equal to or lower than the threshold value Vth, electric power supplied from the backup power supply 91 can be prevented from being supplied to the motor 72. Therefore, electric power of the backup power supply 91 is effectively used to move the DMD element 30 to the parking position. Accordingly, the DMD element 30 can be reliably moved to the parking position. Moreover, since electric power is not consumed by the motor 72, less electric capacity of the backup power supply 91 is required. This also enables attaining miniaturization of the backup power supply 91 and making the backup power supply 91 inexpensive.

(5) The voltage monitoring circuit 140 is configured with a CMOS reset IC. According to this configuration, in comparison with the case of performing determination processing with the microcomputer 110, the voltage monitoring circuit 140 is able to promptly output the forced stop signal Ss when the voltage Vb of the battery power supply 90 has become equal to or lower than the threshold value Vth. This enables promptly returning each micromirror E to the parking position and stopping supplying of electric power to the illumination unit 11 and the motor 72. Therefore, the electric capacity of the backup power supply 91 can also be reduced. Moreover, this also enables attaining miniaturization of the backup power supply 91 and making the backup power supply 91 inexpensive.

(6) The head-up display device 1 is mounted in a vehicle. Generally, the voltage Vb of the battery power supply 90 is unstable as compared with the voltage of a commercial power supply. However, according to the present embodiment, even in a case where an abrupt decrease has occurred in the voltage Vb of the battery power supply 90, since the micromirrors E are moved to the parking position, the micromirrors E can be prevented from being firmly fixed.

Second Embodiment

Hereinafter, a second embodiment in which a display device according to the invention is applied to a head-up display device which is mounted in a vehicle is described. Here, only differences from the first embodiment are described.

Figure 6:
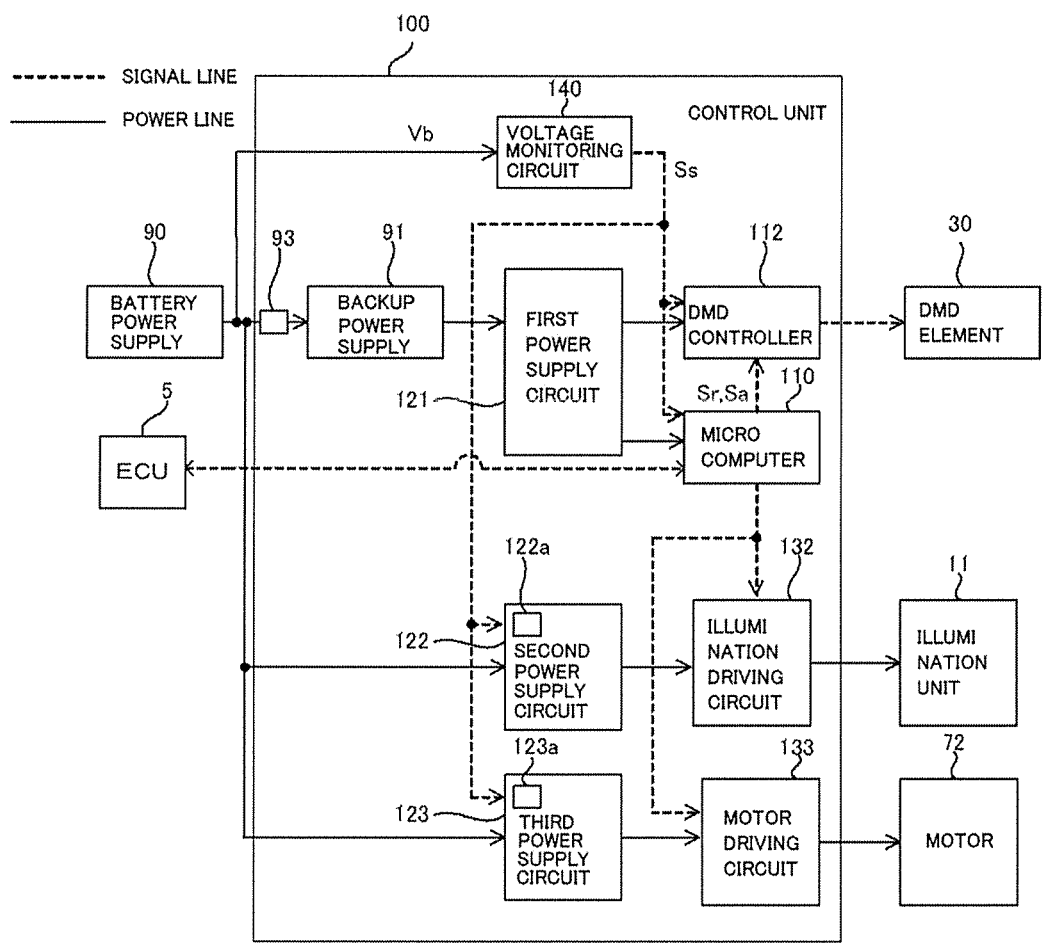
FIG. 6 is a block diagram illustrating an electrical configuration of a head-up display device according to a second embodiment of the invention.

In the present embodiment, as illustrated in FIG. 6, the voltage monitoring circuit 140 is connected to the microcomputer 110. Accordingly, the microcomputer 110 is able to receive the forced stop signal Ss output from the voltage monitoring circuit 140.

Figure 7:
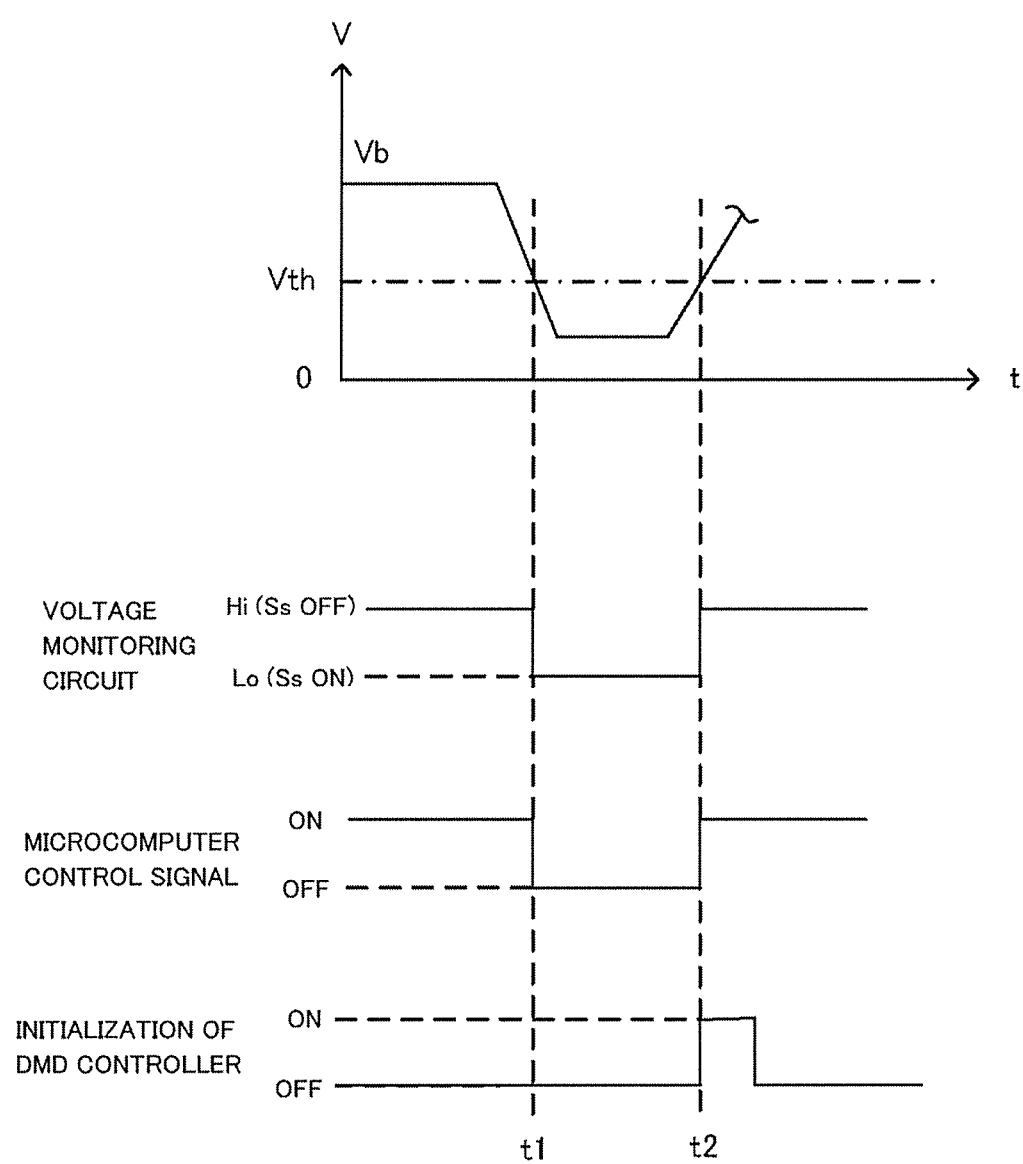
FIG. 7 is a graph illustrating a variation of voltage of a battery power supply and a timing chart illustrating operation timing of a voltage monitoring circuit, a microcomputer, and a DMD controller according to the second embodiment of the invention.

As illustrated in FIG. 7, at time t1, when receiving the forced stop signal Ss output from the voltage monitoring circuit 140, more specifically, when a signal output from the voltage monitoring circuit 140 has switched from a Hi signal to a Lo signal, the microcomputer 110 stops outputting a control signal Sa to the DMD controller 112. At this time, as described in the first embodiment, the DMD controller 112 stops operation after returning each micromirror E to the parking position. After that, upon, for example, returning of the battery power supply 90, at time t2, when entering into a state of not receiving the forced stop signal Ss, more specifically, when a signal output from the voltage monitoring circuit 140 has switched from a Lo signal to a Hi signal, the microcomputer 110 performs return processing and also outputs a reset signal Sr to the DMD controller 112. Upon receiving the reset signal Sr, the DMD controller 112 performs initialization to reset the state obtained at the end of the previous operation. In the return processing, the microcomputer 110 brings the illumination unit 11 and the motor 72 into a state of being able to perform normal operation, via the illumination driving circuit 132 and the motor driving circuit 133. After that, appropriate communications are performed between the microcomputer 110 subjected to the return processing and the DMD controller 112 subjected to the initialization.

Advantageous Effects

Thus, according to the second embodiment described above, the following advantageous effects can be brought about.

(1) For example, as illustrated in FIG. 7, in a case where, although the voltage Vb of the battery power supply 90 has become equal to or lower than the threshold value Vth due to an abrupt voltage variation such as cranking, the voltage Vb has not become lower than a voltage according to which the first power supply circuit 121 is stopped (for example, 3.3 V), or in a case where a time for which the voltage Vb is kept lower than the voltage according to which the first power supply circuit 121 is stopped is short, there is conventionally the following problem. Specifically, while the DMD controller 112 ends operation after returning the DMD element 30 to the parking position, the microcomputer 110 is configured to still continue operation. Therefore, after that, in a case where the voltage Vb of the battery power supply 90 has returned to a voltage exceeding the threshold value Vth (for example, 6 V), the DMD controller 112 returns, but is required to be initialized again because of having been once stopped. Assuming that the DMD controller 112 is not initialized, unmatching may occur in communication between the microcomputer 110, which has continued operation, and the DMD controller 112, which has restarted, so that control of the DMD element 30 performed by the microcomputer 110 via the DMD controller 112 may not be appropriately performed.

In this regard, in the present embodiment, the microcomputer 110 outputs the reset signal Sr to the DMD controller 112 when outputting of the forced stop signal Ss from the voltage monitoring circuit 140 is stopped (for example, at time t2). The DMD controller 112 performs initialization when receiving the reset signal Sr. Therefore, after the battery power supply 90 returns, the DMD controller 112 is initialized. Accordingly, unmatching is prevented from occurring in communication between the microcomputer 110 and the DMD controller 112.

Modification Example

Furthermore, each of the above-described embodiments can be implemented in the following configurations obtained by modifying each embodiment as appropriate.

While, in each of the above-described embodiments, the voltage monitoring circuit 140 is provided, the voltage monitoring circuit 140 can be omitted. In this case, the microcomputer 110 functions in a way similar to the voltage monitoring circuit 140.

Specifically, the microcomputer 110 monitors the voltage Vb of the battery power supply 90 periodically (for example, at intervals of 4 ms), and determines whether the voltage Vb becomes equal to or lower than the threshold value Vth. For example, when the voltage Vb of the battery power supply 90 has become equal to or lower than the threshold value Vth, the microcomputer 110 outputs a stop signal to the DMD controller 112. When receiving the stop signal, the DMD controller 112 returns the DMD element 30 to the parking position. Moreover, at this time, the microcomputer 110 can stop supplying of electric power to the illumination unit 11 and the motor 72 via the illumination driving circuit 132 and the motor driving circuit 133. In the present example, the microcomputer 110 includes a voltage monitoring unit.

While, in each of the above-described embodiments, the diode 93 is connected between the backup power supply 91 and the battery power supply 90, the diode 93 can be omitted.

In each of the above-described embodiments, the voltage monitoring circuit 140 outputs the forced stop signal Ss to the DMD controller 112, the second power supply circuit 122, and the third power supply circuit 123, but can output the forced stop signal Ss only to the DMD controller 112. Moreover, the voltage monitoring circuit 140 can output the forced stop signal Ss only to any one of the second power supply circuit 122 and the third power supply circuit 123 in addition to the DMD controller 112.

While, in each of the above-described embodiments, the head-up display device 1 includes the third power supply circuit 123, the motor driving circuit 133, and the motor 72, these can be omitted.

While, in each of the above-described embodiments, the second power supply circuit 122 and the third power supply circuit 123 are respectively provided with the switch elements 122a and 123a, each of which cuts off the flow path of electricity upon receiving the forced stop signal Ss, the positions of the switch elements 122a and 123a are not limited to those, but can be provided in the illumination driving circuit 132 and the motor driving circuit 133.

In each of the above-described embodiments, the backup power supply 91 is configured with a capacitor, but is not limited to a capacitor as long as having a configuration capable of accumulating electric power and can be a battery.

In each of the above-described embodiments, the microcomputer 110 and the DMD controller 112 are configured as separate members, but can be configured with a single IC.

In each of the above-described embodiments, the display device is an in-vehicle head-up display device, but is not limited to an in-vehicle device and can be a head-up display device that is mounted in a conveyance such as an airplane or watercraft. Moreover, a target to be irradiated with display light L emitted from the head-up display device is not limited to the windshield 2, but can be a dedicated combiner. In a case where the combiner is driven via a new motor, when the voltage Vb of the battery power supply 90 has become equal to or lower than the threshold value Vth, supplying of electric power to the new motor can be stopped. Moreover, the display device can be, for example, a projector that is used indoors or outdoors.

INDUSTRIAL APPLICABILITY

The invention can be applied to a head-up display device.

REFERENCE SIGNS LIST

1 . . . head-up display device
2 . . . windshield
3 . . . viewer
5 . . . ECU
10 . . . illumination device
11 . . . illumination unit
11r . . . red LED
11g . . . green LED
11b . . . blue LED
13 . . . reflection and transmission optical unit
14 . . . luminance unevenness reducing optical unit
20 . . . illumination optical system
30 . . . DMD element
50 . . . projection optical system
60 . . . screen
70 . . . planar mirror
71 . . . concave mirror (reflection unit)
72 . . . motor (driving unit)
80 . . . housing
90 . . . battery power supply
91 . . . backup power supply
93 . . . diode
100 . . . control unit
110 . . . microcomputer
112 . . . DMD controller
121 . . . first power supply circuit
122 . . . second power supply circuit
123 . . . third power supply circuit
122a, 123a . . . switch element
132 . . . illumination driving circuit
133 . . . motor driving circuit
140 . . . voltage monitoring circuit (voltage monitoring unit)

The invention claimed is:

1. A display device that displays an image by driving a DMD element based on electric power supplied from a battery power supply, the display device comprising:
a DMD controller that performs control of the DMD element based on electric power supplied from the battery power supply;
a voltage monitoring unit that monitors a voltage of the battery power supply;
a backup power supply that is capable of supplying electric power to the DMD controller as a backup of the battery power supply;
a microcomputer that controls the DMD controller; and
a first power supply circuit that supplies electric power to the microcomputer and the DMD controller based on electric power supplied from the battery power supply or the backup power supply,
wherein, when the voltage of the battery power supply monitored by the voltage monitoring unit has become equal to or lower than a threshold value, the DMD controller moves the DMD element to a parking position based on electric power supplied from the backup power supply,
wherein the voltage monitoring unit outputs a forced stop signal to the DMD controller when the voltage of the battery power supply has become equal to or lower than the threshold value,
wherein the first power supply circuit generates backup electric power based on electric power supplied from the backup power supply, and
wherein, when receiving the forced stop signal, the DMD controller moves the DMD element to the parking position based on the backup electric power without via the microcomputer.

2. The display device according to claim 1, further comprising:
an illumination unit that irradiates the DMD element with illumination light; and
a second power supply circuit that supplies electric power to the illumination unit based on electric power supplied from the battery power supply,
wherein the voltage monitoring unit outputs the forced stop signal to the second power supply circuit to stop supplying of electric power to the illumination unit.

3. The display device according to claim 1, further comprising:
a reflection unit that reflects a display image emitted from the DMD element;
a driving unit that drives the reflection unit; and
a third power supply circuit that supplies electric power to the driving unit based on electric power supplied from the battery power supply,
wherein the voltage monitoring unit outputs the forced stop signal to the third power supply circuit to stop supplying of electric power to the driving unit.

4. The display device according to claim 1,
wherein when outputting of the forced stop signal from the voltage monitoring unit is stopped, the microcomputer outputs a reset signal to the DMD controller, and
wherein the DMD controller performs initialization when receiving the reset signal.

5. The display device according to claim 2, further comprising:
a reflection unit that reflects a display image emitted from the DMD element;
a driving unit that drives the reflection unit; and
a third power supply circuit that supplies electric power to the driving unit based on electric power supplied from the battery power supply,
wherein the voltage monitoring unit outputs the forced stop signal to the third power supply circuit to stop supplying of electric power to the driving unit.

6. The display device according to claim 2,
wherein when outputting of the forced stop signal from the voltage monitoring unit is stopped, the microcomputer outputs a reset signal to the DMD controller, and
wherein the DMD controller performs initialization when receiving the reset signal.

7. The display device according to claim 3,
wherein when outputting of the forced stop signal from the voltage monitoring unit is stopped, the microcomputer outputs a reset signal to the DMD controller, and
wherein the DMD controller performs initialization when receiving the reset signal.

* * * * *